Figure 1:
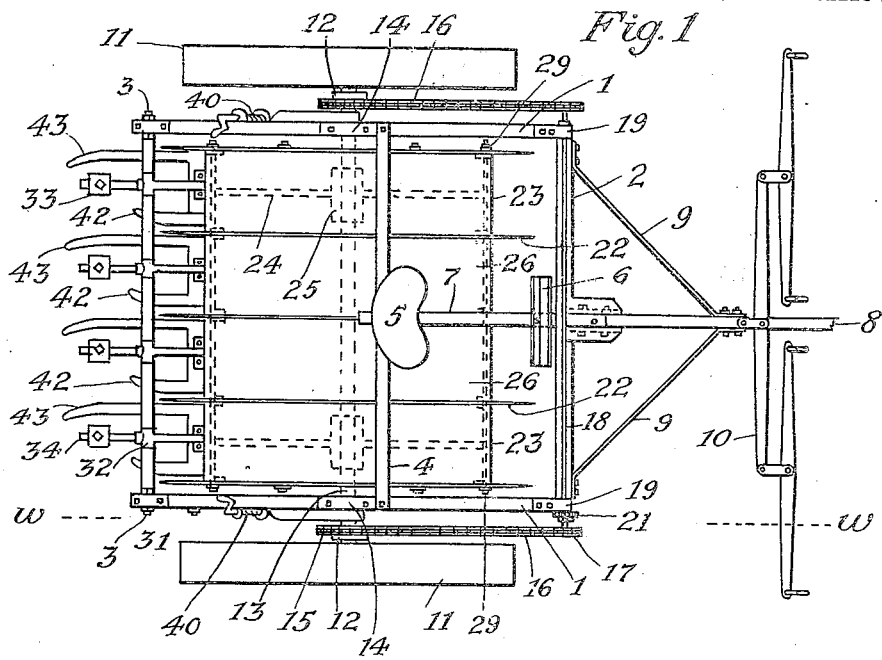

W. F. BROWN.
ROTARY PLOW.
APPLICATION FILED FEB. 26, 1908.

921,357.

Patented May 11, 1909.
3 SHEETS—SHEET 1.

Witnesses:
Theo. Lagaard.
H. A. Bowman.

Inventor:
Walter F. Brown
By P. N. Gunckel
his Attorney.

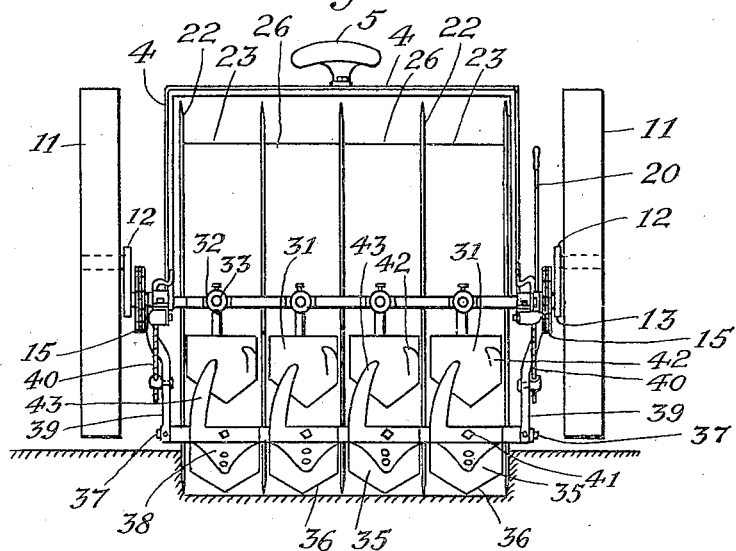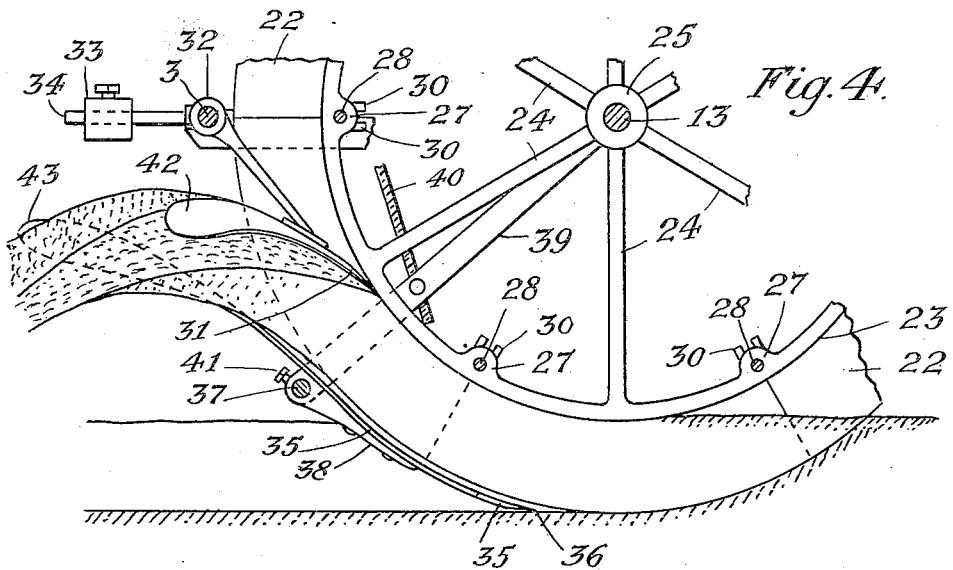

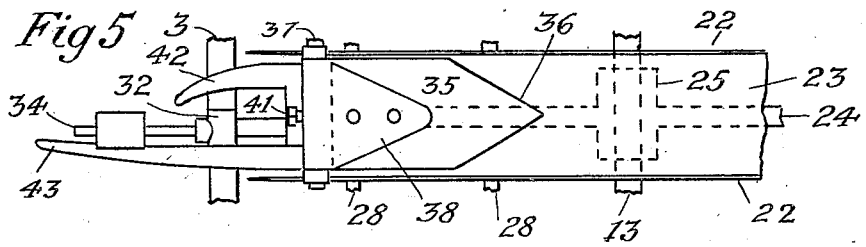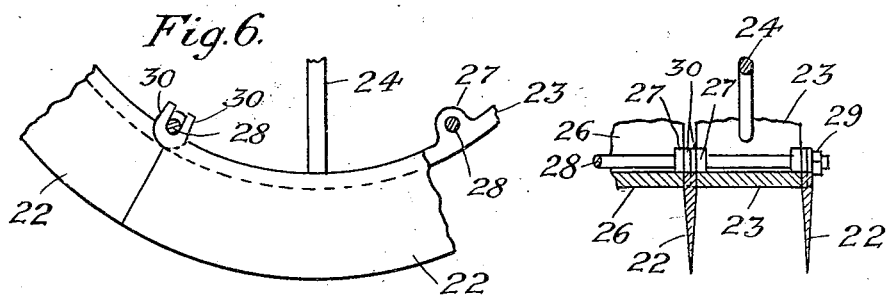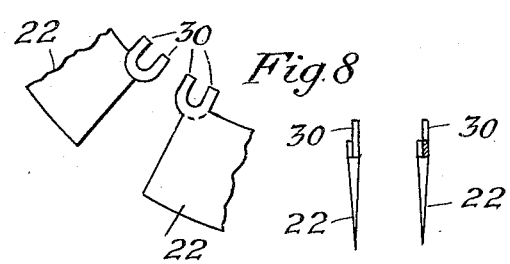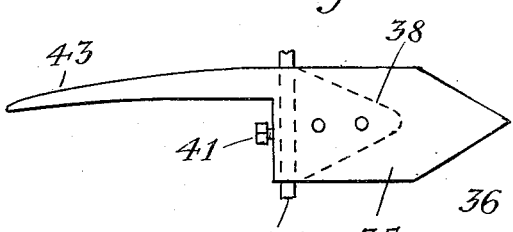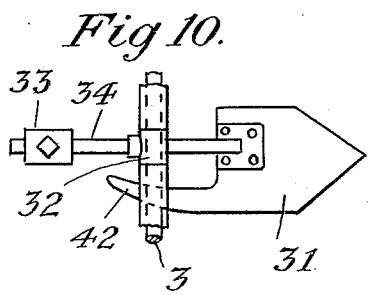

UNITED STATES PATENT OFFICE.

WALTER F. BROWN, OF MINNEAPOLIS, MINNESOTA.

ROTARY PLOW.

No. 921,357.  Specification of Letters Patent.  Patented May 11, 1909.

Application filed February 26, 1908. Serial No. 417,842.

*To all whom it may concern:*

Be it known that I, WALTER F. BROWN, a citizen of the United States, residing at Minneapolis, in the county of Hennepin and State of Minnesota, have invented certain new and useful Improvements in Rotary Plows, of which the following is a specification.

My invention relates to plows and particularly to rotary or revolving plows.

The object of the invention is to produce a rotary or revolving plow of simple and durable construction, efficient in operation, and of comparatively light draft.

Stated in a general way the machine consists of a drum or cylinder of any suitable length and diameter adapted to roll over the ground; and from the periphery of which drum circumferential blades or cutters extend at right angles to the face of the drum and parallel to the direction of its rotation, whereby when the drum is rolled over the ground the blades cut into the ground in lines parallel to the direction of movement of the machine. The blades are spaced a proper distance, so that when the drum is rolled over the ground they, in coöperation with the roller, will lift by frictional contact resistance between each pair of blades or a furrow-slice or ribbon or strip of earth. In rear of the drum are provided centrally-pointed thin blades which extend forward between pairs of cutters to points near to the plane of their lower edges, for cutting roots, freeing the under sides of the furrow-slices and preventing the slices from prematurely falling back into the furrows. The strips of earth may be lifted by the rotation of the drum and blades to a certain predetermined height where they are forced out from between the blades by scrapers provided for that purpose. At this point and for a short distance toward the rear the strips may be supported underneath at one side only by narrow supports, constructed preferably of thin steel, leaving the other sides of the strips unsupported and free to fall by gravity, thereby causing a turning or twisting of the strips so that they may fall into the furrow in angular or inverted positions. The twisting and turning of the strips of earth may be augmented or may be caused by narrow supports, preferably of thin steel, projecting from the lower supporting blades rearward below and at the opposite sides of the strips. The mold-boards or supports for the strips should have a shape and position relative to each other that will cause the strips of earth to slide over the lower and under the upper one, and between the two in a natural easy rolling and twisting motion, to the end that the strips of earth will be deposited in inverted position on the ground.

My improvements are illustrated in the accompanying drawings, in which—

Figure 2:
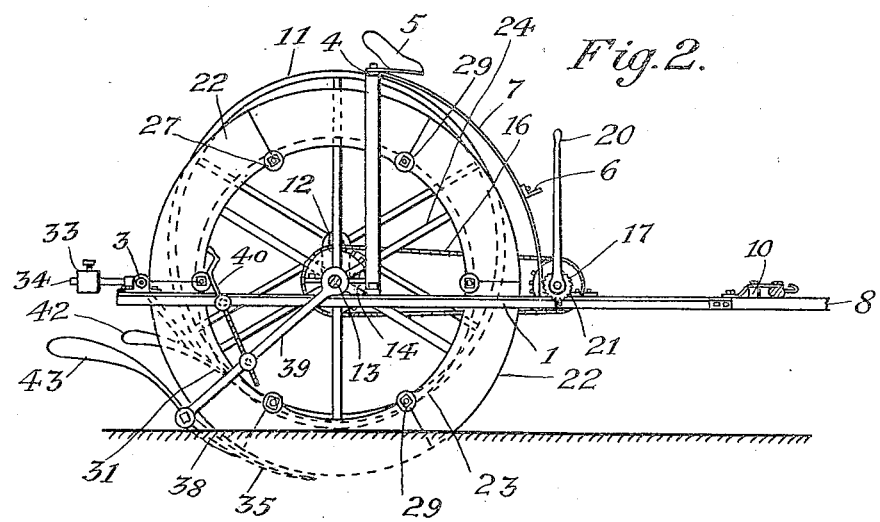

Figure 1 shows a plan view of a riding-plow embodying my improvements; Fig. 2 is a side elevation on the vertical plane of the line *w—w* of Fig. 1; Fig. 3 is a rear elevation of the machine; Fig. 4 is a side view, enlarged, of a portion of the lower and rear parts of the plowing mechanism; Fig. 5 is a view from the under side of Fig. 4; and Figs. 6 to 10 show detached parts of the mechanism.

In the drawings the main machine frame is shown as of rectangular shape and consisting of longitudinal members 1, a transverse member 2 connecting their front ends, and a round rod 3 connecting their rear ends. On an elevated cross-piece 4 is mounted a driver's seat 5, and a foot-rest 6 is provided on a curved bar 7 that extends from the member 2 to the cross-piece 4. To the member 2 is attached the draft-pole 8, which is braced by braces 9, and to the pole is connected a doubletree 10, or other device, for pulling the machine. The riding-wheels 11 are on the cranks 12 of an axle 13, and the axle 13 is journaled in boxes 14 on the frame members 1. Sprocket-wheels 15 on the axle are connected by chains 16 to sprocket-wheels 17 on a rod 18 that turns in bearings 19 at the front of the frame. A hand-lever 20 enables an operator to turn the rod 18 as desired to raise or lower the wheels with reference to the axle, and a ratchet-and-dog device 21 permits the locking of the rod 18 and the parts it controls in positions of adjustment.

The plowing devices comprise a series of circular blades or cutters 22 carried by a drum that is mounted loosely on the axle 13. The drum is preferably composed of sections, the two end sections 23 have spokes 24 and hubs 25 for loosely mounting them on the axle so that they may rotate freely thereon. Intermediate these outer sections are arranged other cylindrical sections 26 that are without spokes or hubs; and all of the sections, 23 and 26, are provided with ears 27 that extend inward and through which bolts 28 are passed and may be tightened and secured by nuts 29 for holding together the group of drum sections. The cutters 22 are preferably formed of sections or segments having pronged lugs 30 formed at their ends on the inner edges, the lugs being offset one-half the thickness of the cutter bodies to permit the segment ends to abut; and the lugs 30 of abutting segments straddle the bolts 28 and are clamped between the ears 27 on the drum sections by means of the bolts and nuts. Thus the several drum sections may be united to form a practically continuous cylinder, and the cutter segments are joined together and clamped in place to constitute continuous circular cutters. The segments are separately removable by loosening the proper bolt-nuts.

While I prefer the construction set forth I do not wish to be confined to it, for obviously the plowing operation would be the same whether the drum consisted of a single structure or were made up of sections and whether the cutters consisted of entire disks or were composed of united segments.

The space between a pair of the cutters 22 determines the width of a furrow and the extent of the projection of the cutters from the face of the drum determines the depth of the plowing and thickness of the furrow-slice. Obviously the depth of the plowing may be regulated by the substitution of cutters of the required diameter for the depth of plowing desired.

For cleaning the drum and preventing the furrow slices from being carried farther around and upward than desirable, scrapers 31, which preferably are centrally pointed, are provided and may be carried by sleeves 32 that turn freely on the transverse rod 3 at the rear end of the plow-frame; and for holding the scrapers in proper frictional contact with the drum adjustable weights 33 on arms 34 extending rearwardly from the sleeves 32 may be employed.

In the space intervening each pair of cutters is arranged at the under side in rear of the axle a blade 35 having a centrally-pointed sharp edge 36 for cutting roots, etc., and to free the under side of the furrow-slice. These blades may be of curved shape substantially concentric with the curvature of the drum and cutters; and they are carried by a transverse rod or bar 37 to which they are attached by plates 38; and the bar 37 is supported by a pair of hangers 39 that are loosely connected to the axle. Adjusting screws 40 connect these hangers with the frame member 1 to enable the bar 37 to be raised or lowered for adjusting the blades bodily in forward or rearward arcs; and the blades may be separately adjusted to raise or lower their points by means of set-screws 41, or other suitable devices, that secure them in place on the bar 37.

To insure the turning over of the furrow-slice if it is carried up to the scraper before it is freed from the drum and cutters, I preferably employ a narrow deflector or mold-board 42 of slightly curved shape and which may be formed as a part of or attached to the scraper 31 at the side toward which the slice is to be turned; and a second narrow deflector or mold-board 43 below the former and at the opposite side of the furrow slice and which may be a rearward extension of or attached to the blade 35. The extent of the turning of the furrow-slice, whether to angular or completely inverted position, may be determined and regulated by the width, curvature, and elevation of the lower mold-board 43, or by that mold-board in conjunction with the upper mold-board 42.

In use the plow mechanism is lowered, by operating the hand-lever 20, to position to allow the cutters to enter the ground, as far as the contact of the drum with the ground will permit, the wheels 11 being out of contact with the ground, as indicated in Fig. 2. As the machine is moved forward the drum will roll on the surface of the ground while the rolling cutters sever furrow slices which are somewhat compressed by the downward pressure of the drum and the resistance of the cutter sides to lateral displacement and remain in the annular spaces formed by the drum and cutters until they are lifted out of the furrows. Such portions of the furrow-slices as do not fall by gravity from the annular spaces as they are being lifted are removed by contact with the scrapers 31, and the gravitating material falls upon the blades 35 and mold-boards 43. As the blades and mold-board extensions are moved horizontally forward beneath the furrow-slices each mold-board 43 supports one edge of the slice or ribbon of earth for a moment after the blade has ceased to support the other edge and body of the slice, with the obvious result of causing the slice to turn as it falls back into the furrow. The upper mold-board 42 aids in this operation, when the furrow-slice adheres sufficiently to be lifted far enough to engage the scraper, because the mold-board 42 then engages and prevents further upward movement of the margin of the furrow-slice opposite that engaged by the mold-board 43 and tends to turn the slice in the same direction as the latter.

The forward sharp-edged portion 36 of the blades 35 are adapted to sever roots and to free the under sides of the furrow-slices from the bottoms of the furrows; and the body portions of the blades are adapted to serve to carry upward and rearward and mix with the furrow-slices the loose earth that may fall from the slices as they are being lifted.

It will be apparent that the mechanical structure set forth can be varied in many respects to accomplish like results, and therefore I do not limit myself to the specific devices set forth.

What I claim and desire to secure by Letters Patent is—

1. A rotary plow, comprising a drum adapted to roll on the surface of the ground, a plurality of thin flat circular cutters projecting at right angles from the periphery thereof, the drum and cutters being arranged and adapted to coöperate in cutting and lifting furrow-slices, scrapers for freeing the furrow-slices from the plowing mechanism, a mold-board arranged between each pair of cutters for receiving and turning the furrow-slice delivered to it, a frame for the plowing mechanism, supporting wheels therefor, and controllable means for regulating the contact of the wheels with the ground, substantially as set forth.

2. A rotary plow, comprising a drum adapted to roll on the surface of the ground, a plurality of thin flat circular cutters projecting at right angles from the periphery thereof, the drum and cutters being arranged and adapted to coöperate in cutting and lifting furrow-slices, scrapers for freeing the furrow-slices from the plowing mechanism, blades for freeing the furrow-slices from the bottoms of the furrows, a frame for the plowing mechanism, supporting wheels therefor, and controllable means for regulating the contact of the wheels with the ground, substantially as set forth.

3. A rotary plow, comprising a drum adapted to roll on the surface of the ground, a plurality of thin flat circular cutters projecting at right angles from the periphery thereof, the drum and cutters being arranged and adapted to coöperate in cutting and lifting furrow-slices, blades for freeing the furrow-slices from the bottoms of the furrows, scrapers for freeing the furrow-slices from the plowing mechanism, a mold-board arranged between each pair of cutters for receiving and turning the furrow-slice delivered to it, a frame for the plowing mechanism, supporting wheels therefor, and controllable means for regulating the contact of the wheels with the ground, substantially as set forth.

4. A rotary plow, comprising a drum adapted to roll on the surface of the ground, a plurality of thin flat circular cutters projecting at right angles from the periphery thereof, the drum and cutters being arranged and adapted to coöperate in cutting and lifting furrow-slices, blades for freeing the furrow-slices from the bottoms of the furrows, means for adjusting the inclination and position of the blades, scrapers for freeing the furrow-slices from the plowing mechanism, a mold-board arranged between each pair of cutters for receiving and turning the furrow-slice delivered to it, a frame for the plowing mechanism, supporting wheels therefor, and controllable means for regulating the contact of the wheels with the ground, substantially as set forth.

5. A rotary plow, comprising a drum adapted to roll on the surface of the ground, a plurality of thin flat circular cutters projecting at right angles from the periphery thereof, the drum and cutters being arranged and adapted to coöperate in cutting and lifting furrow-slices, scrapers for freeing the furrow-slices from the plowing mechanism, coöperating upper and lower mold-boards between each pair of cutters, for receiving and turning the furrow-slices delivered to them, substantially as set forth.

6. A rotary plow, comprising a drum adapted to roll on the surface of the ground, a plurality of thin flat circular cutters projecting at right angles from the periphery thereof, the drum and cutters being arranged and adapted to coöperate in cutting and lifting furrow-slices, blades for freeing the furrow slice from the bottom of the furrow, a frame for the plowing mechanism, supporting wheels therefor, and controllable means for regulating the contact of the wheels with the ground, substantially as set forth.

In testimony whereof I have signed my name to this specification in the presence of two subscribing witnesses this 17th day of February, 1908.

WALTER F. BROWN.

Witnesses:
  M. L. DOUGHERTY,
  P. H. GUNCKEL.